Oct. 17, 1939.  H. C. WELLMAN  2,176,515
SAFETY SHUTTER FOR MOTION PICTURE PROJECTORS
Filed April 23, 1937
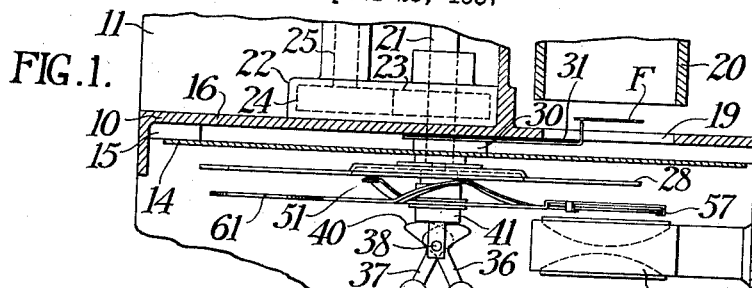
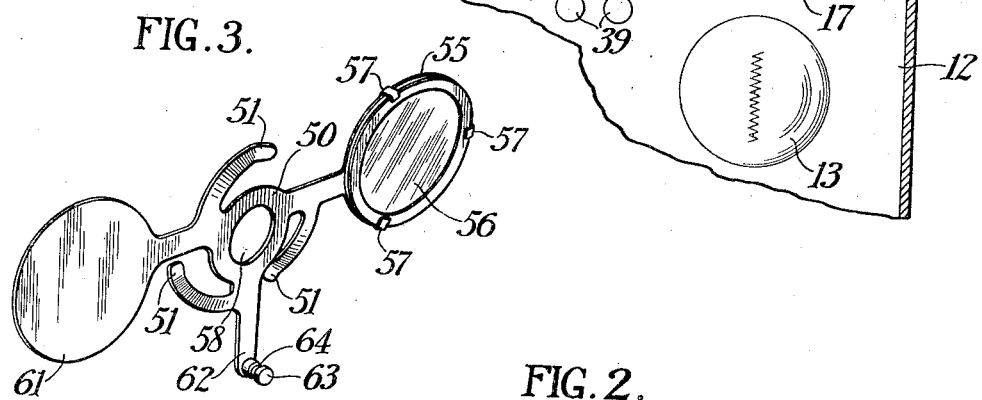
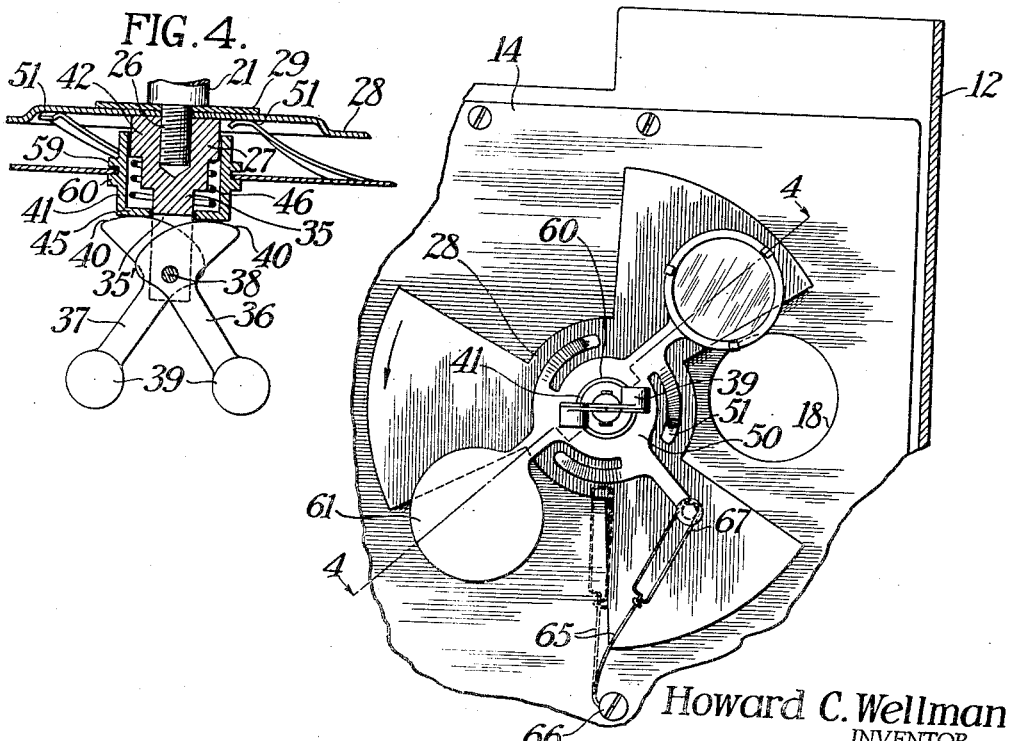
Howard C. Wellman
INVENTOR.
BY
ATTORNEYS Patented Oct. 17, 1939

2,176,515

UNITED STATES PATENT OFFICE 2,176,515

SAFETY SHUTTER FOR MOTION PICTURE PROJECTORS

Howard C. Wellman, Rochester, N. Y., assignor to Eastman Kodak Company, Rochester, N. Y., a corporation of New Jersey Application April 23, 1937, Serial No. 138,627

17 Claims. (Cl. 88—19.4)

The present invention relates to a safety screen for motion picture apparatus, and more particularly to a safety screen which intercepts the light beam in projection types of motion picture apparatus and which is moved out of and into light beam when surrounding circumstances attain predetermined conditions.

Particular care must be exercised in projecting the light beam through photographic film which has a cellulosic base, inasmuch as the intensity of the light beam for satisfactory projection of images on the film must be so great that the film is likely to become ignited. This source of danger has been recognized for a considerable time, and many different types of safety shutters have ben devised which protect the film when stationary or traveling at slow speed, and which are automatically removed from the light beam when the travel of the film has increased to a degree that the film is in no danger of being ignited although exposed to the direct rays of the light source. The known devices for effecting the movement of such a safety shutter are all quite complicated or subject to failure. One of the major faults of devices of this character is found in the jerky manner in which they either move into or out of their operative position. Also, in apparatus where the safety shutter is adapted to operate in either a forward or reverse movement of the projector mechanism, a counter-balancing structure is used to hold the safety shutter in its normal operative position and such a structure lends itself to an undesirable pendulum action wherein the safety shutter may swing back and forth past the light beam before coming to rest in its operative position to obstruct the same.

The primary object of the present invention is the provision of a simple but effective safety screen which normally intercepts the light beam of a motion picture apparatus, and which is automatically moved out of said light beam when the film is moving at or above a predetermined speed.

Another object is to provide a safety screen which is operable during either a forward or reverse movement of the projector mechanism.

And still another object is the provision of a safety screen which is normally held in its operative position by a cantilever spring, said spring tending to return the safety shutter to its normal position rapidly when the speed of the mechanism drops below a predetermined value and to dampen the pendulum action found in known structures where the safety shutter is returned to its normal position by a weight.

A further object is the provision of a safety screen which is moved into frictional engagement with the shutter of the motion picture apparatus by a centrifugal means acting on a bearing supporting the safety screen whereby the movement of the safety screen from its operative to an inoperative position and vice versa will be smooth and free from jerks.

And still another object is to provide a resilient means for normally holding the safety shutter out of frictional engagement with the shutter of the motion picture apparatus so that the instant the mechanism drops below a predetermined speed the safety shutter is moved away from the main shutter and is returned to its operative position by the cantilever spring.

And yet another object is to provide a safety screen which prevents the heat rays from burning the film but may permit sufficient light rays to pass for the projection of still pictures without damaging the film.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is a plan view of the safety screen according to the present invention, and showing its location in a motion picture projector, portions of the projector casing being cross-sectioned for clearer illustration of the safety screen, Fig. 2 is a fragmentary section taken through the projection casing and showing in elevation the safety screen moved to its inoperative position relative to the aperture in the casing, Fig. 3 is a perspective view of the safety screen according to the invention, and Fig. 4 is a section taken on line 4—4 of Fig. 2.

Like reference characters refer to corresponding parts throughout the drawing.

In the illustrated embodiment, the safety screen is shown in cooperation with the known elements of a motion picture projector, however, it is to be understood that such a safety screen may be used under any circumstances which require the protection of a stationary or slow moving film from the total direct rays of the light source.

The projector casing indicated broadly as 10 is made up of two parts, a mechanism chamber 11, and a lamphouse 12 within which a light source such as an incandescent lamp 13 is mounted. A shielding plate 14 is fixed to rib 15 on the wall 16 to prevent the exit of extraneous light from the lamphouse 12. A condenser lens assembly 17 is located in alignment with suitable apertures 18 and 19 in the shielding plate 14 and the wall 16 of the projector housing respectively, and in alignment with each of these apertures is the customary objective tube 20. The shutter shaft 21 journaled in the gear housing 22 in the mechanism chamber 11 extends into the lamphouse 12, and may be driven in either direction of rotation through the gears 23 and 24 from the motor shaft 25. The end of the shutter shaft 21 extending into the lamphouse 12 constitutes a reduced threaded end 26 onto which the nut member 27 is screw-threaded to hold the disk shutter 28 against the washer 29, see Fig. 4. Fixed to that portion of the shutter shaft between the wall 16 and the shielding plate 14 is an eccentric 30 which is adapted to engage an apertured film claw 31 and drive said claw in the customary manner to feed the film strip F past the aperture 19.

The elements thus far described are well-known in the motion picture art and form no part of the present invention except in so far as they enter into combination with the parts of the apparatus to be described hereinafter.

A hollow cylindrical bearing member 41 is slid onto the nut member 27 to loosely engage the shoulder 42 thereof so as to be movable axially of and rotatable with respect to the nut member. One end of the bearing member 41 is provided with a circular flange 45 which loosely engages the reduced end 35 of the nut member 27. A coil spring 46 surrounding the nut member 27 and being enclosed by the bearing member 41 has one end engaging the shoulder 42 on nut member 27 while the other engages the circular flange 45 on the bearing member whereby the bearing member is normally forced axially of the nut member and away from the disk shutter 28.

The reduced end 35 of the nut member is provided with an end slot 35' within which a pair of bellcranks 36 and 37 are pivoted. For this purpose a pin 38 passes through the end slot 35' and through intermediate portions of the bellcranks 36 and 37 so that the same are mounted to pivot about a common axis. The bellcranks 36 and 37 each have a weight 39 located at the end of one arm, and have cam portion 40 on the other arm. The cam portions 40 engage the flange 45 on the bearing member 41, and serve to hold said bearing member on the nut member against the action of the coil spring 46.

The screen member comprises a central portion 50 which has a plurality of integral fingers 51, which may or may not be resilient, and which are offset from the plane of the portion 50. To one side of the central portion 50 is located a ring member 55 to which a safety screen 56 may be fastened by tabs 57. This safety screen may consist of a medium for reducing heat rays such as copper or other heat dissipating wire screens, gold plated glass, mica, slotted metal, or any well known heat retarding material. The materials above mentioned are adapted to pass certain light rays for projecting stills, but it is obvious that if desired an opaque screen can be mounted in the ring 55.

The screen member is mounted in the projector so that the hole 58 in the central portion 59 thereof loosely encircles the bearing member 41 and is located thereon between the shoulders 59 and 60 to move axially of the nut member 27 with the bearing member 41, see Fig. 4. When the screen member is thus mounted on the bearing member 41, the safety screen 56 is counterbalanced by the disk 61 mounted at the opposite side of the central portion 50 to that on which the safety screen is mounted. The safety screen has an arm 62 projecting from the central portion 50 on the end of which is fixed a stud 63 having a groove 64. A cantilever spring 65 having one end fixed to the shielding plate 14 by the screw 66, and the other or looped end 67 loosely engaging the groove 64 in the stud 63, acts to normally hold the screen member on the bearing member 41 so that the safety screen 56 is in covering relation with respect to the aperture 18 in shielding plate 14. During the time that the projector is running at normal speed for projecting pictures upon a screen, the screen member will be moved to the position indicated in Fig. 2 wherein the cantilever spring 65 is deflected from its normal position, indicated in dotted lines.

It will be understood by one skilled in the art, that the cantilever spring 65 will offer comparatively little resistance to the initial movement of the screen member in either direction and will offer rapidly increasing resistance to the movement thereof as it moves farther and farther from its normal position. This action of the spring 65 is advantageous in that it allows an easy and smooth initial pick up of the screen member by the shutter disc 28, and gives a fairly strong spring action at the extreme position of the screen member which serves to return the screen member rapidly to its normal position when the frictional engagement between the shutter disc and the screen member drops below a predetermined value. The length of the cantilever spring 65 is made so that the end of the looped portion 67 thereof will offer a positive stop for limiting the movement of the screen member in an uncovering position relative to the aperture 18 in either direction of movement of the screen member. It will be readily understood that a cantilever spring having an open forked end engaging the stub shaft 63 instead a looped end 67 could be used without sacrificing any of the operating characteristics of my novel spring arrangement save the positive stop feature, and would operate satisfactorily so long as the forked portion were long enough to provide a guide way out of which the stub shaft 63 would not jump as the screen member moved in either direction. This condition could be accounted for by increasing the initial resistance of the cantilever spring relative to the maximum frictional driving force attainable and tending to move the screen member so that the movement of the screen member would be limited to an arc affording an uncovering of the aperture 18. Any screen member of this type whether it be counter-balanced, as is the present one, or not, will when returned to its normal position by a spring, have a tendency to swing back and forth through the light beam in the manner of a pendulum before coming to rest. The use of the cantilever spring 65 for returning the screen member to its normal position, in addition to having the advantages described above, will also present a dampening effect to the pendulum action to which the screen member will be subjected when the same is released from frictional engagement with the disc shutter 28, and will thereby tend to return the screen member to its normal position rapidly.

Bearing member 41 may be held on the nut member 27 by the bellcranks 36 and 37 so that the fingers 51 of the screen member will be held in constant frictional engagement with the disk shutter 28. If this condition exists, the spring fingers 51 should be resilient so that as bearing member 41 is moved toward the disk shutter 28 by outward movement of the bellcranks 36 and 37, the normal frictional engagement between the fingers 51 and the disk shutter 28 will be increased to move the screen member to the position shown in Fig. 2. On the other hand, bearing member 41 may be held on the nut member 27 by the bellcranks 36 and 37 so that normally the coil spring 46 removes the bearing member away from the shutter 28 so that the fingers 51 do not normally engage the shutter disk 27, see Fig. 1, in which case the fingers 51 may be more or less rigid.

The operation of the safety screen according to the present invention will be described hereinafter:

When the motion picture apparatus is operated, the shutter shaft 21 may rotate in either direction depending upon the condition of projection required. The disk shutter 28 and the bellcranks 36 and 37 are also rotated, but at low speed the frictional engagement between the fingers 51 and the surface of the shutter 28, if the bearing member 41 is mounted on the nut member 27 so that a normal frictional engagement exists here, is not sufficient to overcome the action of the cantilever spring 65 and the screen member remains in a normal or protecting position. As the rotational speed of the shutter shaft 21 is increased, the weights 39 on the bellcranks 36 and 37 fly apart by virtue of the centrifugal forces created therein, and take the position shown in Fig. 4. The bellcranks 36 and 37 rotate about pin 38 so that the cam portions 40 of the bellcranks move the bearing member 41 axially along the nut member 27 against the action of the coil spring 46 alone, if the fingers 51 are normally out of frictional engagement with the shutter or against the combined action of the coil spring 46 and the resilient fingers 51 if said fingers are normally in frictional engagement with the shutter 28. This axial movement of the bearing member 41 moves the screen member to increase the frictional engagement between the fingers 51 and the shutter 28, if a normal engagement exists, or if no normal engagement exists, moves the fingers into frictional engagement until a frictional engagement is obtained having such a value to overcome the normal action of the cantilever spring 65. The screen member is then moved in the direction of the shutter rotation, illustrated in Fig. 2 as counterclockwise, until the stud shaft 63 engages the end of the loop 67 of the cantilever spring 65 wherein the shutter screen 56 is moved out of the light beam between the condenser lens assembly 17 and the aperture 19 in the projector casing. Conversely, when the shaft 21 becomes stationary or falls below a predetermined speed the coil spring 46, or if the fingers 51 are resilient, the combined action of the coil spring 46 and the fingers 51 overcome the action of the weights 39, which are brought together, and the baring member 41 and the screen member are moved axially of the nut member 27 so that the frictional engagement between the fingers 51 and the shutter 28 is decreased or relieved as the case may be so that the cantilever spring 65 predominates and moves the safety screen 56 into normal or protective position between the condenser lens assembly 17 and the aperture 19. It should be noticed that the action of the cantilever spring will return the screen member rapidly to its normal position and it will dampen any pendulum effect which might prevail, thus overcoming two difficulties found in known safety screens which depend upon weights for returning them to their normal position.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I claim as new and desire to secure by Letters Patent of the United States is:

1. In a motion picture apparatus having a projection aperture, the combination with a driven shaft adapted to be rotated in either direction for forward or reverse operation of said apparatus, a safety shutter member rotatably mounted on said apparatus and covering said aperture, and an actuating means operatively connected between said shaft and said safety shutter member and adapted upon said shaft attaining a predetermined speed to cause movement of said shutter member away from said aperture in a direction corresponding to the direction of rotation of said shaft, of a cantilever spring member connected to said safety shutter member, initially presenting comparatively small resistance to rotation of said shutter member in either direction, and then presenting rapidly increasing resistance to additional movement thereof.

2. In a motion picture apparatus having a projection aperture, the combination with a driven shaft adapted to be rotated in either direction for forward or reverse operation of said apparatus, a safety shutter member rotatably mounted on said apparatus and covering said aperture, and an actuating means operatively connected between said shaft and said safety shutter member and adapted upon said shaft attaining a predetermined speed to cause movement of said shutter member away from said aperture in a direction corresponding to the direction of rotation of said shaft, of a spring member directly connected to said safety shutter and opposing movement thereof from said aperture by said actuating means, said spring member including a stop means for limiting the movement of said shutter in either direction.

3. In a motion picture apparatus having a projection aperture, the combination with a driven shaft adapted to be rotated in either direction for forward or reverse operation of said apparatus, a safety shutter member rotatably mounted on said apparatus and covering said aperture, and an actuating means operatively connected between said shaft and said safety shutter member and adapted upon said shaft attaining a predetermined speed to cause movement of said shutter member away from said aperture in a direction corresponding to the direction of rotation of said shaft, of a cantilever spring member connected to said safety shutter member, for returning the same to cover said aperture and presenting a substantial dampening action on said shutter during such return movement.

4. In a motion picture apparatus having a projection aperture, the combination with a driven shaft adapted to be rotated in either direction for forward or reverse operation of said apparatus, a safety shutter member rotatably mounted on said apparatus and covering said aperture, and an actuating means operatively connected between said shaft and said safety shutter member and adapted upon said shaft attaining a predetermined speed to cause movement of said shutter member away from said aperture in a direction corresponding to the direction of rotation of said shaft, of a cantilever spring member connected to said safety shutter member, for returning the same to cover said aperture and exerting a dampening action which is applied tangentially to the shutter member.

5. In a reversible motion picture apparatus having an aperture, the combination with a driven shaft adapted to be rotated in either direction, a shutter fixed to said shaft to rotate therewith, of a screen member rotatably mounted with respect to said shaft and axially movable therealong relative to said shutter, and including integral resilient means in direction frictional engagement with said shutter, a resilient member connected directly to and normally holding said screen member in a covering position with respect to said aperture, and a centrifugal means adapted upon attaining a predetermined speed directly to move said screen member axially of the shaft to move said screen member against the action of said integral resilient means to increase the frictional engagement between said shutter and said screen member so that the screen is moved against the action of the resilient member to uncover said aperture.

6. In a reversible motion picture apparatus having an aperture, the combination with a driven shaft adapted to be rotated in either direction, a shutter fixed to said shaft to rotate therewith, of a screen member rotatably mounted with respect to said shaft and axially movable therealong relative to said shutter, and including integral resilient means in direct frictional engagement with said shutter, a resilient member connected directly to and normally holding said screen member in a covering position with respect to said aperture, and a centrifugal means including a pair of bell cranks intermediately pivoted about a common axis, each bell crank having a weighted arm and a cam portion on the other arm adapted to engage and move said screen member upon rotation of said bell cranks whereby said screen is moved against the action of the resilient member to uncover said aperture.

7. In a reversible motion picture apparatus having an aperture, the combination with a driven shaft adapted to be rotated in either direction, a shutter fixed to said shaft to rotate therewith, of a screen member rotatably mounted with respect to said shaft and axially movable therealong relative to said shutter, a cantilever spring having one end fixed to the apparatus and the other end engaging the screen member, and for normally holding the screen member in covering position with respect to said aperture, and a centrifugal means adapted upon attaining a predetermined speed directly to move said screen member axially of the shaft and into frictional engagement with the shutter so that the screen member is moved against the action of the cantilever spring to uncover the aperture.

8. In a reversible motion picture apparatus having an aperture, the combination with a driven shaft adapted to be rotated in either direction, a shutter fixed to said shaft to rotate therewith, a screen member rotatably mounted with respect to said shaft and axially movable therealong relative to said shutter, a centrifugal means adapted upon attaining a predetermined speed directly to move said screen member axially of the shaft and into frictional engagement with the shutter whereby the screen member is moved to uncover said aperture, of a cantilever spring member having one end fixed to the apparatus and the other engaging the screen member and normally holding it in covering relation with said aperture, said cantilever spring initially presenting comparatively small resistance to rotation of said screen member from its normal position in either direction, and then presenting rapidly increasing resistance to additional movement thereof.

9. In a reversible motion picture apparatus having an aperture, the combination with a driven shaft adapted to be rotated in either direction, a shutter fixed to said shaft to rotate therewith, a screen member covering said aperture rotatably mounted with respect to said shaft and axially movable therealong relative to said shutter, a centrifugal means adapted upon attaining a predetermined speed directly to move said screen member axially of the shaft and into frictional engagement with the shutter whereby the screen member is moved to uncover said aperture, of a resilient member connected directly to said screen member and opposing movement thereof from said aperture through said frictional engagement, and stop means on said resilient member for limiting the movement of said screen member in either direction.

10. In a reversible motion picture apparatus having an aperture, the combination with a driven shaft adapted to be rotated in either direction, a shutter fixed to said shaft to rotate therewith, a screen member covering said aperture rotatably mounted with respect to said shaft and axially movable therealong relative to said shutter, a centrifugal means adapted upon attaining a predetermined speed directly to move said screen member axially of the shaft and into frictional engagement with the shutter whereby the screen member is moved to uncover said aperture, of a cantilever spring member having a looped end engaging the screen member, for opposing the movement of the screen member from said aperture in either direction and for limiting the movement of said screen member in either direction.

11. In a reversible motion picture apparatus having an aperture, the combination with a driven shaft adapted to be rotated in either direction, a shutter fixed to said shaft to rotate therewith, a screen member covering said aperture rotatably mounted with respect to said shaft and axially movable therealong relative to said shutter, a centrifugal means adapted upon attaining a predetermined speed directly to move said screen member axially of the shaft and into frictional engagement with the shutter whereby the screen member is moved to uncover said aperture, of a cantilever spring member engaging the screen member for returning the same to cover the aperture and presenting a substantial dampening action on said screen member during such return movement.

12. In a reversible motion picture apparatus having an aperture, the combination with a driven shaft adapted to be rotated in either direction, a shutter fixed to said shaft to rotate therewith, of a screen member rotatably mounted with respect to said shaft and axially movable therealong relative to said shutter, a cantilever spring having one end fixed to the apparatus and the other end engaging the screen member, and for normally holding the screen member in covering position with respect to said aperture, and a centrifugal means adapted upon attaining a predetermined speed directly to move said screen member axially of the shaft and into frictional driving engagement with the shutter so that the screen member is moved against the action of the cantilever spring to uncover the aperture, and resilient means normally forcing said screen member away from said shutter against the action of the centrifugal means, and for effecting an immediate release of the frictional driving engagement between the shutter and the screen member when the centrifugal means becomes ineffective.

13. In a reversible motion picture apparatus having an aperture, the combination with a driven shaft adapted to be rotated in either direction, a shutter fixed to said shaft to rotate therewith, of a screen member rotatably mounted with respect to said shaft and axially movable therealong relative to said shutter, and including fingers integral therewith and offset from the plan thereof to frictionally engage the disc shutter when the screen member is moved toward the disc shutter, a cantilever spring having one end fixed to said apparatus and the other end engaging the screen member, and for normally holding the screen member in covering position with respect to said aperture, a coiled spring surrounding said shaft and normally acting to force said screen member away from said shutter, and a centrifugal means adapted upon attaining a predetermined speed directly to move said screen member axially of the shaft against the combined action of the coiled spring and the integral resilient fingers to increase the frictional engagement between said shutter and said screen so that the screen is moved to uncover said aperture.

14. In a reversible motion picture apparatus having an aperture, the combination with a driven shaft adapted to be rotated in either direction, a shutter fixed to said shaft to rotate therewith, of a bearing member rotatably mounted with respect to said shaft and movable axially therealong relative to the said shutter resilient means normally forcing said bearing member away from said shutter, a screen member rotatably mounted with respect to said bearing member and movable axially of the shaft therewith to be alternately brought into or removed from frictional engagement with the shutter, a spring member directly connected to and acting on the screen member to normally hold it in covering position with respect to said aperture, and a centrifugal means adapted upon attaining a predetermined speed directly to move said bearing member and along with it the screen member axially of the shaft whereby the screen member is moved into frictional engagement with the shutter so as to be moved against the action of the spring member normally acting thereon to uncover the aperture.

15. In a reversible motion picture apparatus having an aperture, the combination with a driven shaft adapted to be rotated in either direction, a shutter fixed to said shaft to rotate therewith, of a bearing member rotatably mounted with respect to said shaft and movable axially therealong relative to the said shutter, resilient means normally forcing said bearing member away from said shutter, a screen member rotatably mounted with respect to said bearing member and movable axially of the shaft therewith to be alternately brought into or removed from frictional engagement with the shutter, a spring member directly connected to and acting on the screen member to normally hold it in covering position with respect to said aperture, and a centrifugal means including a pair of bell cranks intermediately pivoted about a common axis, each bell crank having a weighted arm and a cam portion on the other arm adapted to engage and move the bearing member and along with it the screen member upon rotation of said bell cranks whereby the screen member is moved into frictional engagement with the shutter so as to be moved against the action of the spring member normally acting thereon to uncover the aperture.

16. In a reversible motion picture apparatus having an aperture, the combination with a driven shaft adapted to be rotated in either direction, a shutter fixed to said shaft to rotate therewith, of a bearing member rotatably mounted with respect to said shaft and movable axially therealong relative to the said shutter, a coiled spring surrounding said shaft and normally forcing said bearing member axially of the shaft and away from the shutter, a screen member rotatably mounted with respect to said bearing member and movable axially of the shaft therewith to be alternately brought into or removed from frictional engagement with the shutter, a cantilever spring having one end fixed to the apparatus and the other end engaging the screen member, and for normally holding the screen member in covering position with respect to said aperture, and a centrifugal means adapted upon attaining a predetermined speed directly to move said bearing member and along with it the screen member axially of the shaft whereby the screen member is moved into frictional engagement with the shutter so as to be moved against the action of the resilient means normally acting thereon to uncover the aperture.

17. In a reversible motion picture apparatus having an aperture, the combination with a driven shaft adapted to be rotated in either direction, a shutter fixed to said shaft to rotate therewith, of a bearing member rotatably mounted with respect to said shaft and movable axially therealong relative to the shutter, resilient means normally forcing said bearing member away from said shutter, a screen member rotatably mounted with respect to said bearing member and movable axially of the shaft therewith, an arm fixed to said screen member and extending therefrom, a stub shaft on the end of said arm and extending perpendicularly therefrom, and a centrifugal means adapted upon attaining a predetermined speed directly to move said bearing member and along with it the screen member axially of the shaft whereby the screen member is moved into frictional engagement with the shutter to be moved away from the aperture, of a cantilever spring engaging the stub shaft on the screen member to resist a rotation of the screen member in either direction, to return the same to cover said aperture, to limit the movement of the screen member in either direction, and to present a substantial dampening action on the screen member during the return movement thereof.

HOWARD C. WELLMAN.